United States Patent [19]
Schuplin

[11] 3,875,618
[45] Apr. 8, 1975

[54] BUNDLING TIE

[75] Inventor: Jerome T. Schuplin, Parma Heights, Ohio

[73] Assignee: Fastway Fasteners, Inc., Lorain, Ohio

[22] Filed: Dec. 10, 1973

[21] Appl. No.: 423,423

[52] U.S. Cl............................................. 24/16 PB
[51] Int. Cl............................................. B65d 63/00
[58] Field of Search............ 24/17 AP, 73 PB, 16 R, 24/19, 16 PB, 30.5 P, 206 A, 208 A, 30.5 L, 136 K, 136 L, 170, 191, 24, 25; 248/73, 71, 74 PB; 292/307 A, 318–323, 325

[56] References Cited
UNITED STATES PATENTS

| | | | |
|---|---|---|---|
| 1,565,563 | 12/1925 | Guyot | 24/191 |
| 2,712,917 | 7/1955 | Flora et al. | 248/73 |
| 2,969,216 | 1/1961 | Hallsey | 248/71 |
| 3,132,390 | 5/1964 | Boden | 24/30.5 L |
| 3,490,104 | 1/1970 | Kabel | 24/16 PB |
| 3,494,002 | 2/1970 | Kabel | 24/16 PB |
| 3,570,497 | 3/1971 | Lemole | 24/30.5 P X |
| 3,588,961 | 6/1971 | Farago | 24/16 PB |
| 3,744,096 | 7/1973 | Kok | 24/16 PB |

FOREIGN PATENTS OR APPLICATIONS

| | | | |
|---|---|---|---|
| 1,217,470 | 12/1970 | United Kingdom | 24/16 PB |

Primary Examiner—Donald A. Griffin
Attorney, Agent, or Firm—Baldwin, Egan, Walling & Fetzer

[57] ABSTRACT

A bundling tie for use in looping about a plurality or bundle of elements, such as wires, tubes or cables, and to be drawn taunt about the bundle for mounting of the elements in bundle form on a support, such as for instance on a circuit board or harness board assembly, and comprising a buckle head having an aperture therethrough and a separate insert pawl mounted in the aperture of the head in generally floatable condition, adapted for locking coaction with a strap portion that is disposed in looped condition and passes into said aperture in the head. Such an arrangement not only facilitates the insertion of the strap into the aperture in the head but also ensures that the locking coaction between the pawl and the strap is such that pullout of the strap from the head is prevented. In one embodiment, the floating pawl is eliminated and a wedgeinsert is provided severably attached to the head of the tie and adapted to be forced into wedging coaction in the head with the strap portion, to hold the latter in looped condition.

14 Claims, 26 Drawing Figures

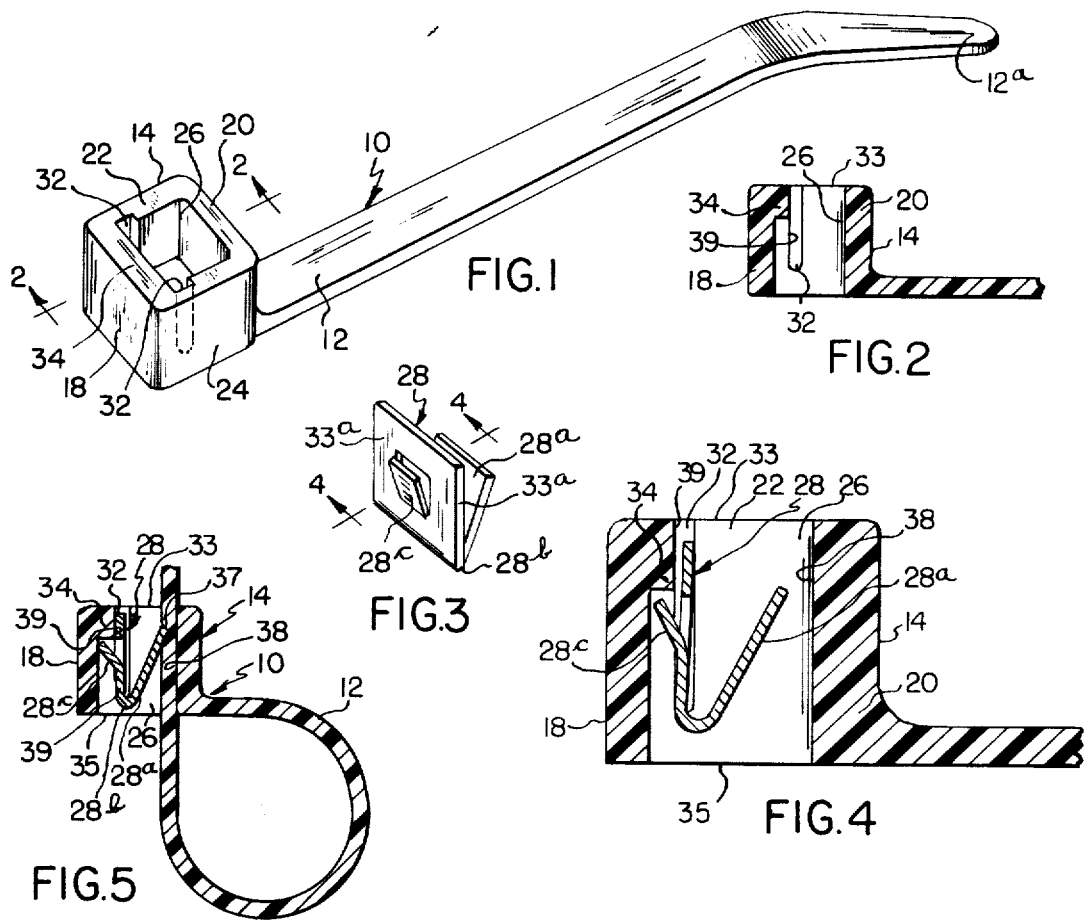
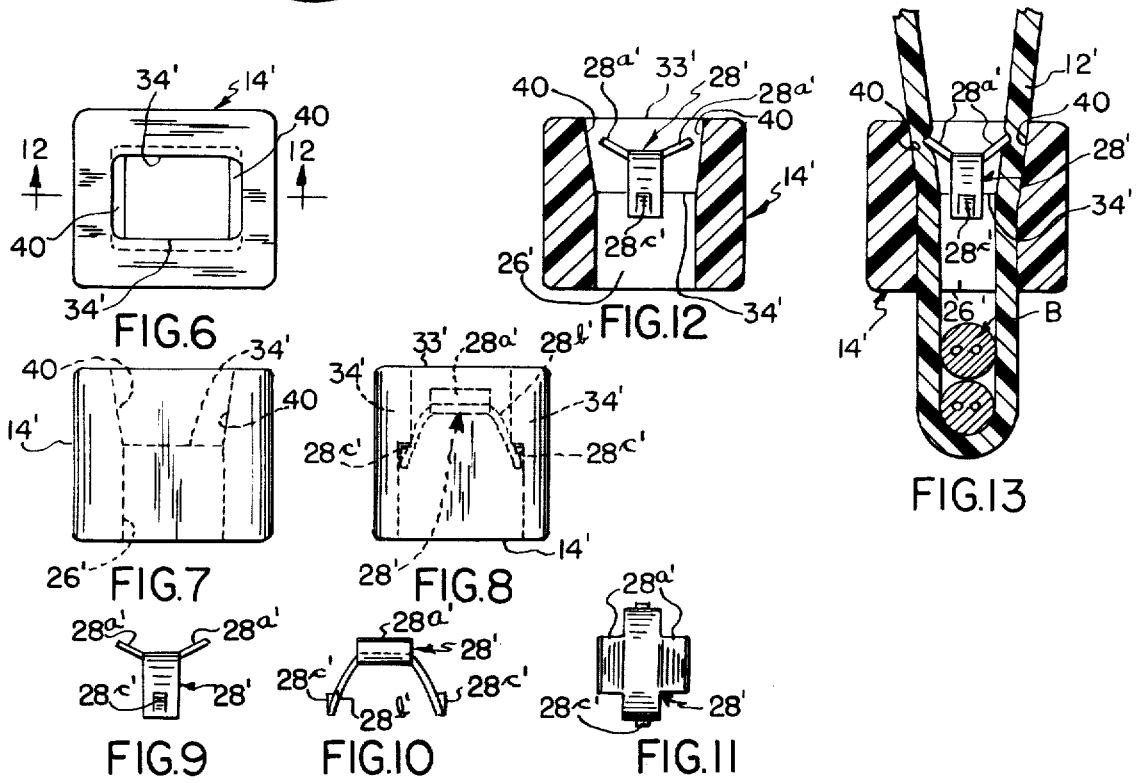

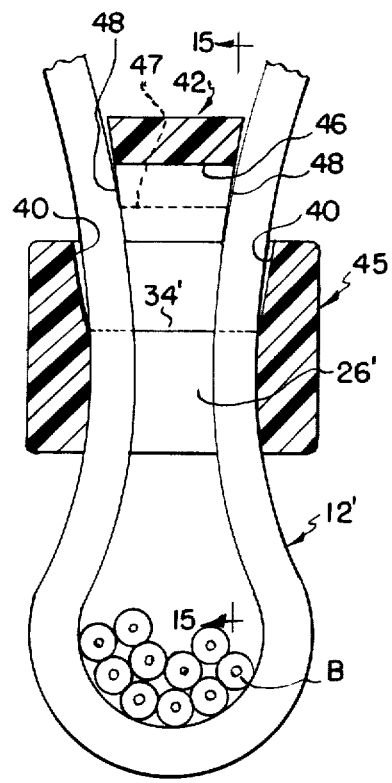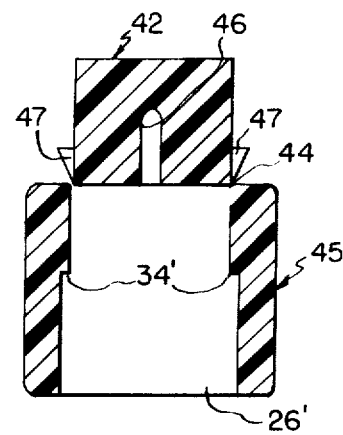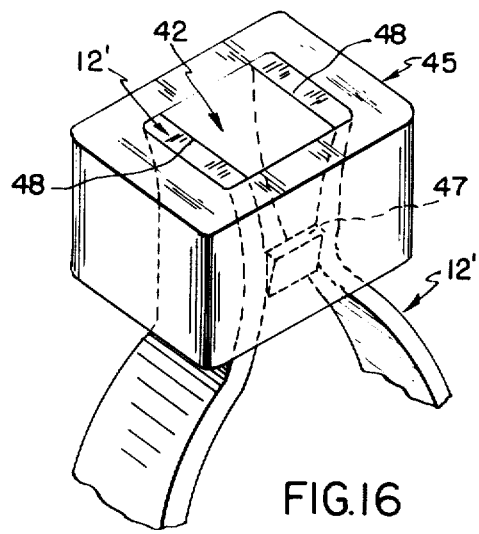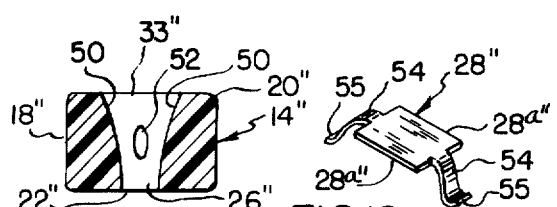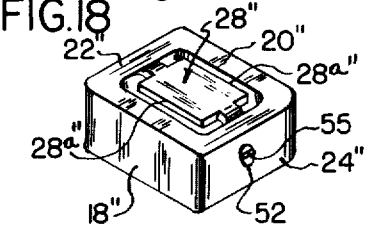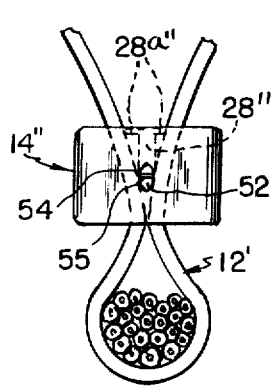

BUNDLING TIE

This invention relates in general to bundling ties for elements, such as for instance wires, tubes, cables or the like, and more particularly relates to an improved bundling tie which embodies an apertured buckle head and a strap portion which is adapted to be disposed in looped condition and passed into the aperture in the head, with separate insert means on the head for holding the strap in looped condition.

BACKGROUND OF THE INVENTION

Bundling ties for use in electric wiring and controls for aircraft, automobiles, switchboards, wherein the wiring or controls are installed in the form of harnesses comprising several conductors, tied or held together at spaced points, are well known in the art. It is also known to have a separate metallic insert member comprising what is known as a pawl, inserted into the apertured head of the tie, with such pawl being adapted for locking coaction with the strap portion. U.S. Pat. No. 3,186,047 dated June 1, 1965 to Daniel P. Schwester discloses one arrangement of plastic tie having a metal insert mounted in a head of the tie, adapted to cooperate with a strap portion, to allow drawing of the strap through the head, while preventing retraction of the strap in the opposite direction. In such prior art arrangements, the insert is relatively stationarily anchored in the head, and does not float in the head to enable the whole insert to move relative to the head during entry of the strap portion into the head.

SUMMARY OF THE INVENTION

The present invention provides a bundling tie which includes an apertured buckle head adapted to receive a strap portion therein, and with a separate insert mounted on the head and extending into the aperture thereof, adapted for locking coaction with the strap portion for holding the latter in looped condition, and wherein the whole insert member is generally floatably mounted in the head, so that the strap can be readily moved past the insert in the aperture without binding, but wherein the insert will effectively grip the strap to prevent withdrawal of the latter from the head. The invention also provides a bundling tie comprising a severable wedge insert initially attached to the head of the tie and adapted to be forced after separation from the head into wedging coaction in the head with the strap portion.

Accordingly, an object of the invention is to provide a novel bundling tie.

A further object of the invention is to provide a novel bundling tie of the type comprising a plastic buckle head and a separate insert pawl movably mounted on the head to facilitate entry of a strap portion of the tie.

Another object of the invention is to provide a bundling tie wherein a head portion thereof is formed of plastic material and has an aperture therethrough, with a separate pawl insert mounted in the head and extending into the aperture, and a tie which embodies means for providing for expeditious insertion of the strap portion through the aperture into locking coaction with the pawl but which also provides good resistance to pullout of the strap portion from the head portion.

Another object of the invention is to provide a bundling tie of the above-described type wherein the strap portion can be readily inserted into the head portion and into locking condition with the pawl and which includes means floatingly mounting the whole pawl insert in the head, for facilitating insertion of the strap portion into the aperture in the head and past the insert.

Another object of the invention is to provide a bundling tie wherein the separate insert is initially disposed exteriorly of the head portion of the tie and is connected thereto by a severable means which upon rupture thereof permits forcing of the insert into the apertured head portion, to lock the strap portion in looped condition with respect to the head portion.

Other objects and advantages of the invention will be apparent from the following description taken in conjunction with the accompanying drawings wherein:

BRIEF DESCRIPTION OF THE DRAWINGS

FIG. 1 is a perspective view of a bundling tie embodying the invention;

FIG. 2 is a fragmentary, sectional view taken generally along the plane of line 2—2 of FIG. 1, looking in the direction of the arrows;

FIG. 3 is a perspective view of the separate insert member adapted to be mounted in the head portion of the tie illustrated in FIGS. 1 and 2;

FIG. 4 is an enlarged, fragmentary sectional view of the head portion of the tie of FIGS. 1 and 2 illustrating the insert member of FIG. 3 mounted therein;

FIG. 5 is a view generally similar to FIG. 4 but showing a strap portion inserted through the aperture of the head and with a tongue portion of the insert engaging in locking coaction with the strap portion, to prevent withdrawal movement thereof from the head;

FIG. 6 is a reduced size, top plan view of a head portion of another embodiment of tie having means for generally floatingly mounting an insert member on the head portion;

FIGS. 7 and 8 are respectively side and end elevational views of the head portion of FIG. 6;

FIG. 9 is an end elevational view of a double tongue insert adapted for mounting in the buckle head of FIGS. 6 through 8;

FIG. 10 is a side elevational view of the insert illustrated in FIG. 9;

FIG. 11 is a top plan view of FIG. 9;

FIG. 12 is an enlarged, sectional, fragmentary view of the insert member of FIGS. 9 through 11 as mounted in the buckle head of FIGS. 6 through 8;

FIG. 13 is a view similar to that of FIG. 12 but showing the strap portion disposed through the aperture in the head, and coacting in locked condition with the double tongue insert;

FIG. 14 is an enlarged, sectional illustration of another embodiment of bundling tie, utilizing an insert member which originally is disposed exteriorly of the aperture of the buckle head, and is attached thereto by a severable connection, so that upon rupture thereof, the insert can be forced into wedging coaction with the strap portion of the bundling tie extending through the apertured head;

FIG. 15 is a sectional view taken generally along the plane of line 15—15 of FIG. 14, but with the strap portion removed;

FIG. 16 is a perspective view of the tie of FIGS. 14 and 15 after the insert member has been wedged into locking coaction with the strap portion, and with the strap portion having its ends which extend exteriorly of the buckle head portion severed so as to be flush with the buckle head surface;

FIG. 17 is a fragmentary, sectional, elevational view of another embodiment of tie wherein the buckle head portion has openings formed therein adapted for mounting a double tongue insert;

FIG. 18 is a perspective view of the insert pawl member for assembly with the buckle head of FIG. 17;

FIG. 19 is a perspective view of the assembled head and insert portions of FIGS. 17 and 18;

FIG. 20 is an elevational view of the buckle head of FIG. 19 having a strap portion inserted through the head;

DESCRIPTION OF PREFERRED EMBODIMENTS

Figure 21:
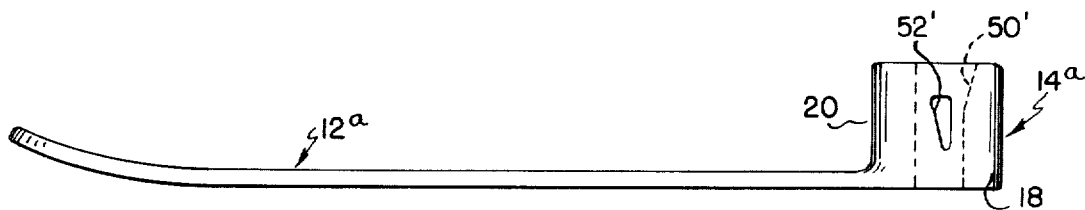
FIG. 21 is a fragmentary, elevational view of another embodiment of bundling tie constructed in accordance with the invention, and one with openings formed in the buckle head portion thereof for mounting a single tongue insert.
Figure 22:
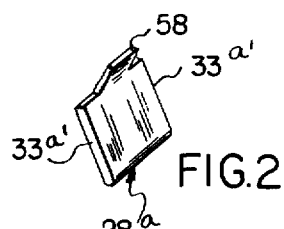
FIG. 22 is a perspective view of the single tongue insert pawl member adapted for mounting in the head portion of FIG. 21.

Referring now again to the drawings, there is shown a bundling tie 10 of elongated nature comprising a strap portion 12 and a buckle head portion 14. Such tie may be molded from a plastic or synthetic resin-type material, such as for instance nylon, polypropylene, polyethylene or like flexible materials. As can be best seen in FIG. 1, the free end portion 12" of the strap portion 12 may be bent to extend out of the plane of the remainder of the strap in a direction away from the head portion 14. This facilitates picking up of the strap or bundling tie by workmen and also aids in insertion of the free end of the strap portion into locking coaction with the insert member in the head portion as will be hereinafter described.

The head portion 14 of the bundling tie, in the embodiment illustrated, is a generally hollow, rectangular shaped frame, having end walls 18, 20 and side walls 22, 24. The walls of the head portion form an aperture or passageway 26 through the head portion and into which the strap portion 12 is adapted to be passed when the tie is looped about itself and about a bundle of elements for retaining the latter.

Referring now to FIGS. 3, 4 and 5, separate insert member 28 is provided which is adapted to be generally floatingly mounted in the head portion 14 and is adapted for locking coaction with the strap portion 12 for holding the latter in looped condition. Insert 28, in the embodiment illustrated is a generally V-shaped member in side elevation, and comprises a diagonal extending locking tongue 28ª, a body section 28ᵇ to which section 28ª is coupled and a tab section 28ᶜ which in the embodiment illustrated is formed from the material of the body section 28ᵇ and pressed out of the plane thereof. The side walls 22, 24 of head 14 on the interior surfaces thereof are provided with slots 32 (FIGS. 1, 2 and 4) which slots commence at the exit end 33 of aperture 26 and extend lengthwise of the aperture and terminate interiorly of the head as can be best seen in FIG. 2. Slots 32 are of sufficient width so that wing portions 33ª on the body section 28ᵇ of the insert are received therein in relatively loose relation, so that the insert is generally floatingly movable relative to its mounting slots.

Head portion 14 is provided with an overhanging ledge 34 (FIGS. 4 and 5) which is adapted to overlap the outwardly projecting tab 28ᶜ on the insert member, to limit movement of the insert member out of its mounted condition in the aperture 26. It will be seen that the tab 28ᶜ has sufficient flexibility at its connection to the body section 28ᵇ of the insert, so that the insert 28 can be forced downwardly past the ledge 34 during insertion into slots 32, afterwhich tab 28ᶜ springs back outwardly into underlying relation with the ledge.

As can be seen in FIG. 5, when the strap section 12 is passed through the entrance end 35 of the aperture 26 past the insert 28, the generally floating condition of the insert member relative to the head enables the strap to readily pass the diagonal tongue 28ª. Any attempt to withdraw the strap from the aperture causes the tongue 28ª of the pawl to diggingly grip the confronting face of the strap as shown at 37 in FIG. 5 and prevents withdrawal thereof. It will be understood that there is a certain amount of flexibility of the tongue 28ª of the pawl insert so that the tongue can be forced out of interference with the strap by the latter during its entry through the aperture 26 and into locking coaction with the insert. It will be noted that the interior defining surface 38 of wall 20 of the head defining the aperture abuts one side of the strap portion when the insert is engaged in locking coaction with the strap, and the insert is forced against the outermost defining surface 39 of the mounting slots 32.

Referring now to FIGS. 6 through 13, there is illustrated another embodiment of bundling tie which includes an insert member 28' having a pair of tongues 28ª' formed thereon, with the insert member being adapted for engaging coaction with spaced ledges 34' in the head 14'. Insert 28' is adapted to grippingly engage both sections of a looped strap portion 12' (FIG. 13) and maintain the latter in looped condition relative to the head. In this embodiment, the strap portion 12' is not joined to the head 14' but instead is furnished as a separate part.

The plural tongues 28ª' of insert 28' project diagonally outwardly relative to the body or mounting section 28ᵇ' of the insert and toward the respective confronting sloped surface 40 at exit end 33' of aperture 26' through the head 14'. Section 28ᵇ' is generally of inverted U-shaped configuration, as can be best seen in FIG. 10. Each arm section thereof embodies a tab 28ᶜ' projecting outwardly therefrom, and preferably formed or sheared from the material thereof. Tabs 28ᶜ' overlap aforementioned ledges 34' (FIG. 8) on the head portion 14' to thus interlock the insert to the head portion against withdrawal movement in a direction toward the exit end 33' of the aperture 26' through the head portion. As can be best seen in FIGS. 8 and 12, the tabs 28ᶜ' preferably project outwardly sufficiently so as to just engage the confronting defining side surfaces of the aperture 26', so as to movably mount the insert in the aperture. When both sections of looped strap 12' are inserted through the aperture, the tongues 28''' on the insert extending diagonally outwardly, move into gripping interlocking coaction with the confronting sections of the strap 12' if withdrawal of the latter from the head is attempted. Hereagain, it will be seen that since the insert is not stationarily positioned in the head portion, it generally floats therein and that the inserted ends of the strap 12', move the insert 28' relative to the head portion during insertion of the strap through the aperture 26' in the head portion. FIG. 13 illustrates the strap portion looped about a plurality of wires or tubes B.

Referring now to FIGS. 14 through 16, there is shown a further embodiment of bundling tie wherein the insert member 42 thereof is formed exteriorly of the buckle head and in this instance is formed of plastic material, and is joined as at 44 to the head by means of a thin web or section of plastic, which is adapted to be subsequently ruptured to permit the insert to be forced down into the head into wedging coaction with the strap 12', to hold the strap in looped locked condition with respect to the buckle head 45. Insert 42 is preferably formed of non-rigid plastic such as for instance nylon, and preferably has a slot 46 formed therein so as to provide some "give" to the insert when it is forced downwardly into the aperture in the head 45 which may be formed generally similar to head 14' of FIGS. 6 and 7. Moreover, the insert 42 has tabs 47 formed thereon and adapted to be disposed in overlapping retaining coaction with the ledges 34' in the head, upon forcing of the insert down into wedging coaction in the head, thus preventing withdrawal movement of the strap 12'. After the ends of the looped strap are inserted into the aperture 26' through the head and past the wedge surfaces 48 on the insert (FIG. 14) and the insert 42 has been wedged down into the head (FIG. 16), the free ends of the strap portion 12' can be severed flush with the top surface of the keeper head if so desired, and as shown in FIG. 16.

Referring now to FIGS. 17 through 20, there is shown a further embodiment of bundling tie which includes buckle head member 14'' having an aperture 26'' extending therethrough, with the end walls 18'', 20'' of the head having interior surfaces defining the aperture 26'', with such interior surfaces being curved as at 50 in divergent fashion toward the exit end 33'' of the aperture, as shown for instance in FIG. 17.

Side walls 22'', 24'' of the buckle head each includes an elongated generally oval-shaped opening 52 in which is movably mounted a separate pawl insert 28''. Pawl insert 28'' which may be conveniently formed of sheet metal includes opposed tongue portions 28''', each of which is adapted for locking coaction with an opposed strap section of looped strap 12', when the latter has been inserted into the buckle head and past the insert. The distal end of the respective tongue 28''' is adapted to bite into and lock the confronting strap section for maintaining the strap 12' in looped condition about a bundle of wires, cables, tubes or the like. The insert 28'' includes leg sections 54 having lateral foot portions 55 which are adapted to be received in the respective of the openings 52 in the side walls of the head, for generally floatingly mounting the insert pawl 28'' on the head 14''.

In assembling the insert 28'' into the head, the legs 54 may be compressed until the foot sections are disposed in confronting relation to openings 52, after which upon release, the legs spring out relative to one another to move the foot portions into the confronting opening in generally loose condition, so that the pawl insert has limited up and down movement relative to the respective opening 52. This enables the ends of the looped strap 12' to be readily pushed through the buckle head, so that the strap can be fed past the locking tongues 28''' of the insert, to facilitate assembly of the strap with the buckle head. Upon pulling down of the strap, the substantially horizontal tongues dig into the confronting strap section and prevent pull-out of the strap from the buckle head. During any such downward pull-out of the strap 12', the foot portions 55 on the legs of the insert attempt to move downwardly, with any such movement being limited by engagement between the defining edges of the respective opening 52 and the foot portion 55.

While the pawl insert may be readily formed of metal, as aforementioned, other suitable materials such as for instance plastics might be utilized under predetermined conditions.

Once the strap sections are pushed through the aperture 26'' and past the tongues 28''' of the insert, the latter can not move or tilt and firmly grips the confronting strap sections, to hold the strap in looped condition. The free ends of the looped strap can be severed off flush with the top of the buckle head, if so desired.

Figure 23:
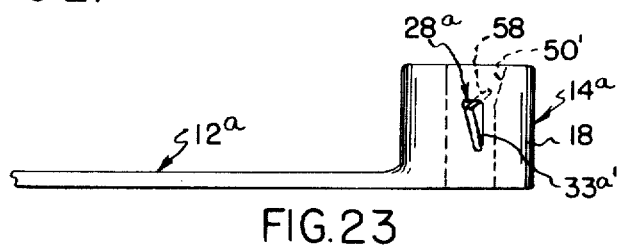
FIG. 23 is a fragmentary side-elevational view of the assembled head and insert of FIGS. 21 and 22.
Figure 24:
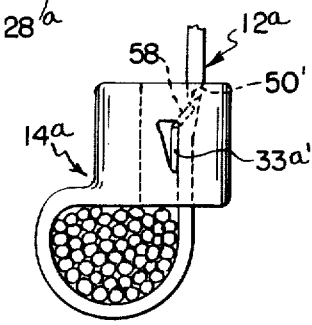
FIG. 24 is a fragmentary side-elevational view showing the strap portion of the tie of FIG. 23 passed through the apertured head portion into locking coaction with the floating insert.

Referring now to FIGS. 21 through 24, there is shown another embodiment of bundling tie wherein the buckle head and strap are integrally secured together similar to the FIGS. 1 and 2 embodiment, with the head 14'' having openings 52' in the side walls of the head, adapted to receive wings 33''' on the pawl insert 28''. As can be best seen in FIG. 23, the insert and openings 52' are so formed that the insert can tilt rearwardly away from the generally curved interior defining surface 50' of end wall 18, to permit ready passage of the strap portion 12'' through the head. Upon attempted withdrawal movement of the strap, the tongue 58 of the insert grips the confronting strap section, and prevents withdrawal of the strap from the head. The openings 52' in the side walls of the head 14'' are of generally inverted right-angled triangular configuration as shown in FIGS. 21 and 23, for providing the aforementioned generally floating movement of the separate pawl insert 28'' with respect to the head. Insert 28'' can be forced into the apertured head until the wing portions 33''' of the insert snap into the wing receiving openings 52'.

Figure 25:
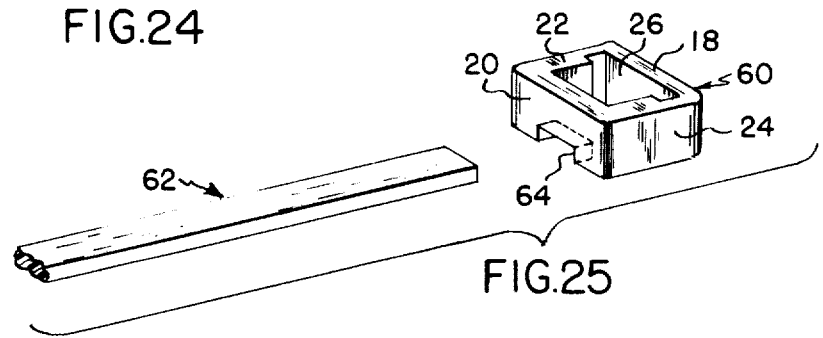
FIG. 25 is a fragmentary, generally diagrammatic illustration of a bundling tie embodying the invention and produced in two parts.
Figure 26:
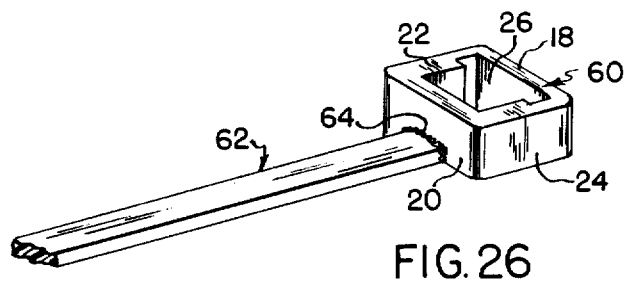
FIG. 26 illustrates subsequent joining of such parts of FIG. 25 together to form a unitary bundling tie.

Referring now to FIGS. 25 through 27, there is shown a bundling tie wherein the buckle head 60 and the strap portion 62 are separately formed, and then means are provided for securing one end of the strap to the head, to form an integral bundling tie. Such attachment of the head and strap portions may be accomplished by means of suitable adhesives or preferably ultrasonic welding of the head with the respective end of the strap as at 64 (FIG. 26). In this connection, the head is preferably provided with a recess 64 therein for receiving the end of the strap portion in snug relation so that it is conveniently positioned for securing of the strap to the head. It will be understood, of course, that wherever a prior illustrated embodiment comprises an integral head and a strap portion, that such can be formed by utilizing a separate buckle head and separate strap portions and subsequently welding or securing the same together as an integral unit.

From the foregoing description and accompanying drawings, it will be seen that the invention provides novel bundling ties for looping about a bundle of elements, and comprising a head portion and a strap portion, with the head portion having an aperture therethrough with a separate insert member mounted on the head in generally floating relation, for facilitating entry of the strap into the aperture in the head, and into locking coaction with the insert, and wherein the insert effectively locks the head against "pull-out" of the strap portion from the head.

The terms and expressions which have been used are used as terms of description and not of limitation, and there is no intention in the use of such terms and expressions of excluding any of the equivalents of any of the features shown or described, or portions thereof, and it is recognized that various modifications are possible within the scope of the invention claimed.

What is claimed is:

1. A flexible bundling tie including an elongated strap and a buckle head adapted for locking coaction with the strap, said head having an aperture therethrough adapted to receive the strap, a separate insert mounted on said head and extending into said aperture, said insert being adapted for locking coaction with said strap and against withdrawal movement of the strap when the latter is looped and passed into said aperture and into coaction with said insert, means generally floatingly mounting said insert on said head for facilitating entry of the strap into said aperture and wherein said head comprises laterally oriented slots, said insert comprising a pawl having wing portions adapted to be received in generally loose condition in said slots in said head and providing said floatingly mounting means, a tab on said pawl projecting in a direction generally outwardly thereof, said head having a ledge portion overlying said tab for limiting outward movement of said tab with respect to said head and with respect to said mounting slots.

2. A tie in accordance with claim 1 wherein said strap and said head are formed of plastic material, said insert including a tongue projecting into said aperture for engaged locking coaction with said strap in said aperture.

3. A tie in accordance with claim 2 wherein said insert is formed of metal, said tongue generally diagonally projecting into said aperture for gripping coaction with said strap when said strap is disposed in said aperture.

4. A tie in accordance with claim 1 wherein said aperture includes an entry end and an exit end, said aperture including defining side surfaces, said slots being formed in opposing of said side surfaces commencing at the exit end of said aperture and terminating prior to the entry end of said aperture, said slot in each of said side surfaces extending lengthwise generally parallel to the longitudinal direction of extension of said aperture.

5. A tie in accordance with claim 1 wherein said aperture is defined in part by an interior face of said head adapted for engagement with one side of the strap when the strap is in locked condition in the head, said face being disposed in confronting relation to said insert which engages the strap on the opposite side thereof.

6. A tie in accordance with claim 1 wherein said tab is formed from partially severed material of said insert and bent out of the plane thereof.

7. A flexible bundling tie including an elongated strap and a buckle head adapted for locking coaction with the strap, said head having an aperture therethrough adapted to receive the strap, a separate insert mounted on said head and extending into said aperture, said insert being adapted for locking coaction with said strap and against withdrawal movement of the strap when the latter is looped and passed into said aperture and into coaction with said insert, means generally floatingly mounting said insert on said head for facilitating entry of the strap into said aperture, and wherein said insert comprises a body portion having lateral wings thereon adapted to be received in slots in said head, said slots comprising and means floatingly mounting said insert on said head, a tab on said body portion projecting outwardly therefom and disposed in overlapping coaction with a ledge on said head for limiting withdrawal movement of said insert from said head.

8. A flexible bundling tie including an elongated strap and a buckle head adapted for locking coaction with the strap, said head having an aperture therethrough adapted to receive the strap, a separate insert mounted on said head and extending into said aperture, said insert being adapted for locking coaction with said strap and against withdrawal movement of the strap when the latter is looped and passed into said aperture and into coaction with said insert, means generally floatingly mounting said insert on said head for facilitating entry of the strap into said aperture, and wherein said head is of generally hollow rectangular shaped configuration having opposing end walls and opposing side walls, said side walls including said means for floatingly mounting said insert in said head, said head including a bridge portion extending across said head and defining a ledge, said insert including a tab which is positioned for engagement with said ledge to limit outward movement of said insert relative to said head.

9. A flexible bundling tie including an elongated strap and a buckle head adapted for locking coaction with the strap, said head having an aperture therethrough adapted to receive the strap, a separate insert mounted on said head and adapted to extend into said aperture, said insert being adapted for locking coaction with said strap, and against withdrawal movement of the strap when the latter is looped and passed into said aperture and into coaction with said insert, means generally floatingly mounting said insert on said head facilitating entry of the strap into said aperture, and including a wedge comprising said insert, means securing said wedge to said head in generally aligned relation to said aperture, the last mentioned means comprising said means generally floatingly mounting said insert on said head and being severable to permit movement of the wedge from exteriorly of the head into the aperture and into wedging coaction with said strap when the latter extends through the aperture, to lock the strap in the aperture in said head, said head having ledge means thereon, and said wedge having tab means thereon adapted for engagement with said ledge means for limiting outward movement of said wedge from said aperture in said head.

10. A flexible bundling tie including an elongated strap and a buckle head adapted for locking coaction with the strap, said head having side walls partially defining an aperture therethrough adapted to receive the strap, a separate insert mounted on said head and extending into said aperture, said insert being adapted for locking coaction with said strap and against withdrawal movement of the strap when the latter is looped and passed into said aperture, and wherein said head has recess means formed in each of the side walls thereof, said insert being of generally V-shaped configuration in side elevation and having wings thereon received in said recess means for floatably mounting said insert in said aperture, said insert including an outwardly projecting tab, and said head including a ledge with which said tab coacts in overlapping relation for retaining said insert in said head and in said recess means.

11. A flexible bundling tie including an elongated strap and a buckle head adapted for locking coaction with the strap, said head having an aperture therethrough adapted to receive the strap, a separate insert mounted on said head and extending into said aperture, said insert being adapted for locking coaction with said strap and against withdrawal movement of the strap when the latter is looped and passed into said aperture and into coaction with said insert, means generally floatingly mounting said insert on said head for facilitating entry of the strap into said aperture, and wherein said insert comprises at least a pair of tongues projecting laterally in opposite directions therefrom and adapted for gripping engagement with confronting sections of said strap disposed in said aperture.

12. A tie in accordance with claim 11 wherein said head comprises opposing walls defining said aperture, certain of said walls having openings therethrough generally aligned with one another, said insert comprising mounting means received generally loosely in said openings, said openings and said mounting means comprising said means floatingly mounting said insert on said head, said openings being of generally oval shape in side elevation.

13. A flexible bundling tie including an elongated strap and a buckle head adapted for locking coaction with the strap, said head having an aperture therethrough adapted to receive the strap, a separate insert mounted on said head and extending into said aperture, said insert being adapted for locking coaction with said strap and against withdrawal movement of the strap when the latter is looped and passed into said aperture and into coaction with said insert, means generally floatingly mounting said insert on said head for facilitating entry of the strap into said aperture, said head comprising opposed side walls, and opposed end walls defining said aperture, certain of said walls having openings therethrough generally aligned with one another, said insert comprising mounting means received generally loosely in said openings, said openings and said mounting means comprising said means floatingly mounting said insert in said aperture, tongue means on said insert for grippingly engaging said strap to lock the latter in said head, and wherein said openings are of generally inverted triangular shaped configuration in side elevation.

14. A tie in accordance with claim 13 wherein said aperture is defined in part by an interior face of said head, said face being adapted generally for engagement with one side of the strap when the strap is in locked condition in the head, said face being disposed in confronting relation to said insert which engages the strap on the opposite side thereof, said head face being at least in part obliquely oriented with respect to the lengthwise axis of said aperture.

* * * * *